United States Patent
Artzi et al.

(10) Patent No.: US 8,031,634 B1
(45) Date of Patent: Oct. 4, 2011

(54) SYSTEM AND METHOD FOR MANAGING A VIRTUAL DOMAIN ENVIRONMENT TO ENABLE ROOT CAUSE AND IMPACT ANALYSIS

(75) Inventors: Amanuel Ronen Artzi, Framingham, MA (US); Igg M. Adiwijaya, Fair Lawn, NJ (US); Sudhir Vijendra, White Plains, NY (US); Ehud Kleers, West Hartford, CT (US)

(73) Assignee: EMC Corporation, Hopkinton, MA (US)

( * ) Notice: Subject to any disclaimer, the term of this patent is extended or adjusted under 35 U.S.C. 154(b) by 784 days.

(21) Appl. No.: 12/058,834

(22) Filed: Mar. 31, 2008

(51) Int. Cl.
*H04L 12/28* (2006.01)
(52) U.S. Cl. .................... 370/254; 370/395.53
(58) Field of Classification Search .................. 370/254, 370/255, 395.53
See application file for complete search history.

(56) References Cited

U.S. PATENT DOCUMENTS

| | | | |
|---|---|---|---|
| 2004/0225927 A1* | 11/2004 | Warpenburg et al. | 714/47 |
| 2005/0021742 A1* | 1/2005 | Yemini et al. | 709/224 |
| 2005/0137832 A1* | 6/2005 | Yemini et al. | 702/183 |
| 2006/0167672 A1* | 7/2006 | Goldman et al. | 703/13 |

* cited by examiner

Primary Examiner — Chirag Shah
Assistant Examiner — Jenkey Van
(74) Attorney, Agent, or Firm — Krishnendu Gupta; Joseph D'Angelo

(57) ABSTRACT

A virtual domain management system is provided which associates application, physical and virtual domains to enable propagation of events, symptoms and other information across the domains. The virtual domain manager collects events and symptom information across multiple domains by correlating domain topology models. Using a causality matrix and codebook technology the virtual domain manager uses the information to perform root cause and impact analysis across domains. Information from the analysis may be fed back into the domains to enhance domain management.

16 Claims, 19 Drawing Sheets

Virtual Server Objects ← 300

| | |
|---|---|
| – ManagedEntity | 310 |
| • configIssue, configStatus, name, overallStatus | 312 |
| – HostSystem | 314 |
| • name, overallStatus | 316 |
| – VirtualMachine | 315 |
| • name, guestState, connectionState, overallStatus, powerState | 317 |
| – GuestOS | 318 |
| • guestId, guestState, guestFullName | 320 |
| – PhysicalNic | 322 |
| • device, driver, ipAddress | 324 |
| – HostVirtualNic | 326 |
| • port, portgroup, mac, ip_dhcp | 328 |
| – HostVirtualSwitch | 330 |
| • name, numPorts, portgroup, pnic | 332 |
| – Network | 334 |
| • name, accessible | 336 |

Virtual Center Objects ← 331

| | |
|---|---|
| – ComputeResource | 338 |
| • overallStatus, totalCPU, effectiveCPU, customValue, configStatus | 340 |
| – DataCenter | 342 |
| • displayName, overallStatus, configStatus | 344 |
| – ResourcePool | 346 |
| • name, overallStatus, unreservedForPool, owner, configStatus | |

FIG. 3

| RCA | VIRTUAL ENVIRONMENT MANAGEMENT SYSTEM SYMPTOMS | | | ASSURANCE MANAGER SYMPTOMS | | | | | IMPACT | | | |
|---|---|---|---|---|---|---|---|---|---|---|---|---|
| | HOST UNRES-PONSIVE | ADMIN DOWN OPERATION | GUEST OS UNRES-PONSIVE | HOST UNRES-PONSIVE | SNMP AGENT UNRES-PONSIVE | PEER PORT DOWN OR FLAPPING | GUEST APP UNRES-PONSIVE | | VIRTUAL HOST | DATA CENTER | APPLI-CATION | VIRTUAL NETWORK |
| VIRTUAL HOST DOWN (ADMIN/ELSE) | X | X | X | X | X | X | X | | | X | X | X |
| | X | | | X | X | | | | | | | |
| GuestOS DOWN | | X | X | | | | | | | | X | |
| | | | X | | | | X | | | | | |
| VIRTUAL MACHINE IS DOWN | | X | X | | X | X | X | | X | | X | |
| CABLE IS DISCONNECTED | X | X | | X | X | | X | | X | X | X | |
| | | | | | | X | | | | | | |
| INTERFACES DOWN (ADMIN/ELSE) | | | | | | | | | X | X | ? | ? |

FIG. 8

SYSTEM AND METHOD FOR MANAGING A VIRTUAL DOMAIN ENVIRONMENT TO ENABLE ROOT CAUSE AND IMPACT ANALYSIS

FIELD OF THE INVENTION

This invention relates generally to modeling systems and more particularly to modeling a virtualized environment in a manner that enables cross-domain propagation of problems and symptoms from network, storage and application domains to the virtual environment to thereby increase virtual environment awareness and enable root cause and impact analysis.

BACKGROUND OF THE INVENTION

Virtualization is a method of computer programming that provides a layer of abstraction between an application infrastructure and a physical infrastructure. Virtualization dynamically maps applications to resources according to resource availability and business needs. As networked infrastructures are dynamic in nature, virtualization effectively 'hides' the impact of changes in the underlying infrastructure from the service and application layer.

A virtual environment generally includes a virtual server or cluster of virtual servers which associates applications and services with logical representations of underlying physical compute resources (such as, memory, capacity and compute). The information that is available for provisioning and other management decisions is generally limited to any information that is provided at the interfaces. As a result, the virtual server is unaware of characteristics of the application environment and physical environment as a whole. For example, the virtual environment may not be aware that multiple applications are associated with a particular service, and may experience performance benefits from co-location. In the area of network connectivity, a virtual server may not be aware of the underlying network topology therefore is unable to assess the impact that events and changes at the underlying network infrastructure, potentially resulting in sub optimal decision making with respect to the environment hosted on the virtual layer.

One problem associated with the lack of awareness of the virtual environment is the difficulty in tracking the cause of performance degradations and availability problems. It is often difficult to determine the root cause of errors in a virtualized environment, and often there is confusion as to whether the errors are associated with the application/consuming service, the virtual environment, the underlying physical environment or some combination thereof.

Another problem associated with the lack of awareness of the virtualized environment is the lack of understanding regarding the impact of the physical environment on the virtualized one and in turn the impact of that environment on the hosted applications/services and possibly the business process relying on them. It would be desirable to identify a method and architecture which could be used to provide increased infrastructure awareness to virtualized environments.

Hence, there is a need in the industry for a method and system for representing, analyzing and determining root cause errors and the impact of such errors in Virtualized Environment.

SUMMARY OF THE INVENTION

According to one aspect of the invention, a virtual domain management system and process is provided which constructs and maintains a topology model of a virtual environment and associates objects in the virtual environment with objects at an application layer and in an underlying physical infrastructure. Such an arrangement enables cross-domain exchange of events and other information between the application, virtual and physical domains. According to another aspect of the invention, a causality model of the virtual environment is constructed and dynamically maintained to control the propagation of problems and symptoms through the topology models from the underlying domains such as storage and network to the virtualized environment domain and through it to the hosted application domain. Codebook technology is used to determine root cause (RCA) and impact analysis using the cross-domain problem and symptom data. RCA and impact analysis information could be provided to the virtualization layer for better analysis of failures and the impact of events on the virtual environment to increase the intelligence of provisioning and other behaviors.

According to a further aspect of the invention, a method for managing a domain includes the steps of maintaining a first topology associated with the domain and instantiated from models which represent the structure and causal behavior of one or more virtual entities, wherein the domain is a first domain and correlating the first topology to a second topology associated with a second domain by identifying overlapping objects of the first topology and the second topology, the overlapping objects comprising topology end points, wherein information is propagated from the first domain to the second domain through the topology end points.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated by the claims.

BRIEF DESCRIPTION OF THE DRAWINGS

FIG. 3 illustrates a plurality of virtual objects and their properties instantiated from models of virtual entities according to the present invention;

FIG. 8 illustrates a table that is used to relate symptoms manifested by events in the infrastructure to problems for use in root cause and impact analysis;

Figure 1:
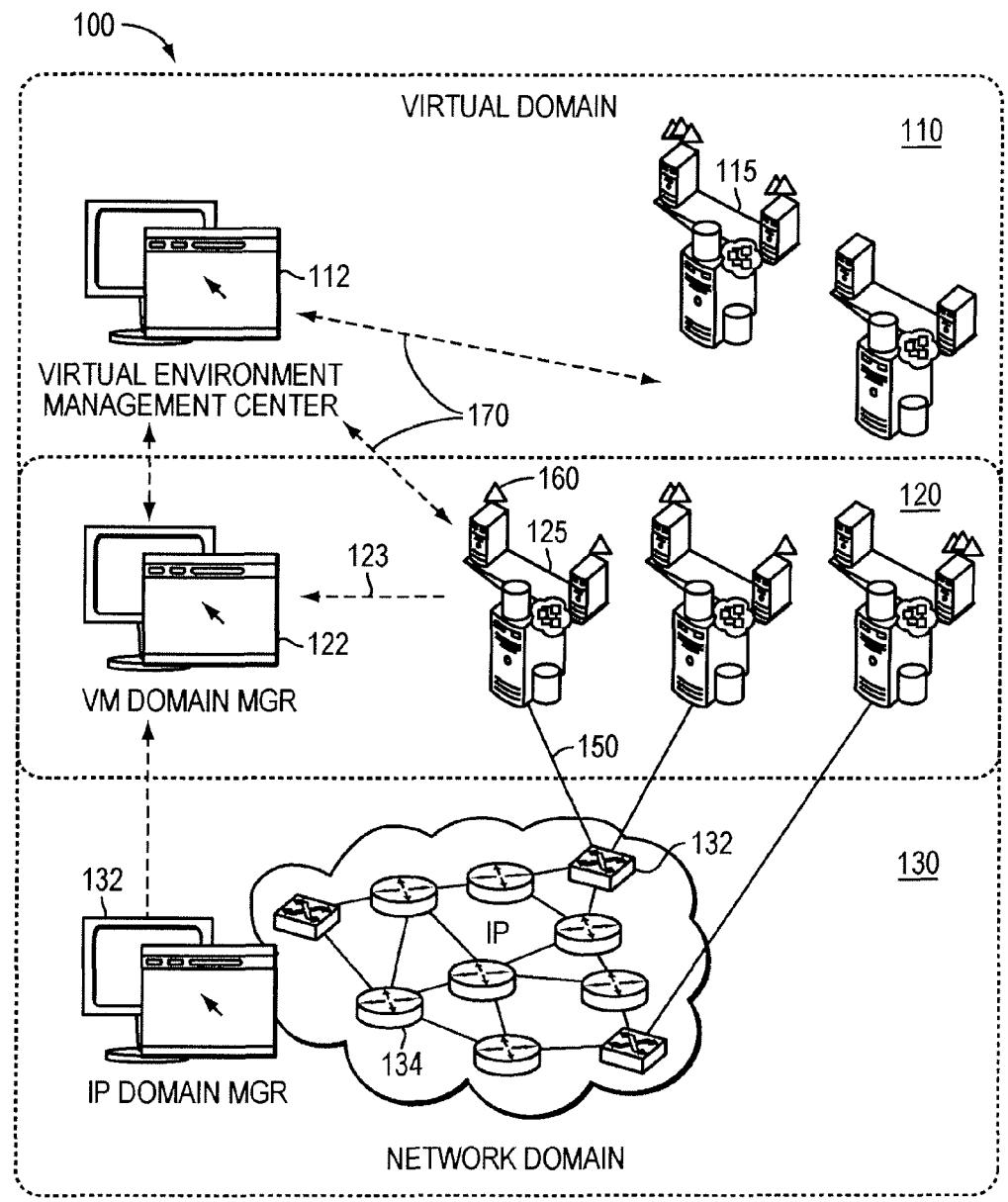
FIG. 1 is a block diagram illustrating a virtualized Information Technology (IT) infrastructure and in particular illustrating the a virtual domain management system which enables cross-domain propagation of problems, symptoms, events and other information between application, virtual and physical domains.

It is to be understood that these drawings are provided solely for the purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possible supplemented with reference characters where appropriate, have been used to identify similar elements.

DETAILED DESCRIPTION

According to one aspect of the invention a virtual domain management system is provided which associates application, physical and virtual domains to enable propagation of events, symptoms and other information across the domains. The virtual domain manager collects events and symptom information across multiple domains by correlating domain topology models. Using a causality matrix and codebook technology the virtual domain manager uses the information to perform root cause and impact analysis across domains. Information from the analysis may be fed back into the domains to enhance domain management.

Central to the virtual domain management system is the modeling of the virtual environment using virtualization models. In one embodiment, the virtualization model is an extension of known models, written in a common language for describing a structure having classes, attributes, instances and relationships, and adapted for virtual domain management. The language may be textual, such as the Managed Object Definition Language (MODEL) available from EMCC® System Management ARTS (SMARTS), of White Plains, N.Y., DMTF Common Information Model (CIM), or the Unified Model Language (UML), although the invention is not limited to the use of any particular language for modeling virtual entities.

A virtualization model incorporates a structural model of entities in the virtual domains with a causality model of symptom/problem relationships between the virtual domain objects. The structural model details the attributes and relationships between virtual entities while the causality model models the behavior of entities, where problems, symptoms and events are defined and a causality chain (propagation chain) is constructed via relationships between behavior entities. The causality model thus relates behaviors in an abstract and general way by identifying dependences between problems (causing events at the nodes of a topology) and the symptoms (detectable events in the topology) as propagation chain through the structure model relationships Examples of model based system representation using the Smarts InCharge Common Information Model (ICIM) model for generating structural and causal models is discussed in commonly owned U.S. Patent Application Number 20050021742, entitled "Method and Apparatus for Multi-Realm System Modeling", U.S. Patent Application number 20050210132, entitled "Method and apparatus for determining causality mapping of distributed systems", incorporated herein by reference.

One feature of the ICIM modeling approach is that it uses a common class hierarchy that enables instantiation of a virtual object for each discovered virtual entity using MODEL tools. Thus the virtualization model may be declared as static classes from which many objects or instances are instantiated at run time to build a virtualized environment topology across which symptoms and events may be propagated. Thus the structural models and causality models associated with a virtualization model may be re-used as new objects and relationships are instantiated in the dynamic virtualized environment topology model.

According to one aspect of the invention, the virtual domain management system correlates the virtualized environment topology to an infrastructure comprising an application domain and an underlying physical domain by identifying overlapping objects in the domains, and defining relationships that enable the propagation of symptom and event information both horizontally and vertically across the domains. As a result, the virtual domain manager is able to collect event and symptom information horizontally and vertically from all domains. In one embodiment, the virtual domain manager includes a causality matrix that associates received symptoms with problems and identifies impacted entities. The causality matrix can be used together cross-domain symptom and event information and with codebook technology to perform root cause and impact analysis as described in commonly owned U.S. Pat. Nos. 7,003,433, 6,868,367, 6,249,755, 5,661,668, and 5,528,516, incorporated herein by reference. Root-cause and impact analysis results may be fed back to existing virtual environment management tools, to increase the intelligence of virtual environment management.

FIG. 1 illustrates a virtual domain 110 and a network domain 130. A virtual domain manager 122 essentially provides a bridge for exchanging event and other information between the virtual domain and the network domain. Although a network domain is shown in FIG. 1, it will be appreciated that the virtual domain manager may bridge information from application, storage and any other domain to the virtual domain.

The virtual domain manager communicates with a virtual environment management center 122 and an IP domain manager 132. In one embodiment, the virtual domain manager may communicate directly with a virtual server and also may communicate with other entities in the virtual domain, as indicated by lines 123.

The virtual domain 110 comprises a plurality of virtual machines 115, 125, etc. Each of the virtual machines supports one or more application services, represented as triangles in FIG. 1, such as application service 160. The virtual machines are defined and provisioned by the virtual environment management center (VEMC) 122. An example of a VEMC that may benefit from the use of the present invention is the VirtualCenter product provided by VMWare®, Inc. of Palo Alto, Calif., although the present invention is not limited to any particular virtual center.

The VEMC 122 may comprise software for provisioning virtual machines and monitoring performance of physical servers and virtual machines. The VEMC 122 may be used to control one virtual server or a cluster of virtual servers. In addition, the VEMC is responsible for controlling High availability, mobility and disaster recovery. The virtualized environment topology is thus inherently dynamic in nature. As a result of the abstraction of the virtual environment from the physical infrastructure, and the dynamic nature of infrastructure, before the advent of the present invention it has been difficult to identify the root cause of error in the presence of such a dynamic topology. However, by linking the application, virtual and physical domains, the virtual domain management system of the present invention ensures that accurate, cross domain event and symptom information may be considered using code book technology to define causality in an abstract way that adapts to the changing topology for improved root cause and impact analysis.

The network domain 130 includes a plurality of devices, such as switch 134 or edge router 132. An IP domain manager 132 is used to manage the IP network 130 in accordance with network policies regarding availability, quality of service, security and the like.

The virtual domain management system 122 identifies and models virtual entities and their relationships to build a virtualized environment topology model, extracts physical topology from the IP domain and reconciles overlapping objects (such as server and network interface) in virtual and physical topology models. The virtual domain manager subscribes to events in the application and, IP (and storage) domains. Triggered events propagate across the physical topology model to the virtual topology model through the overlapping objects according to the causality models of the virtual entities. The virtual domain manager analyzes the events using a causality matrix and codebook technology to perform root cause and impact analysis, feeding the results back to the VEMCS to increase VEMCS awareness for improved virtual environment management.

Figure 2:
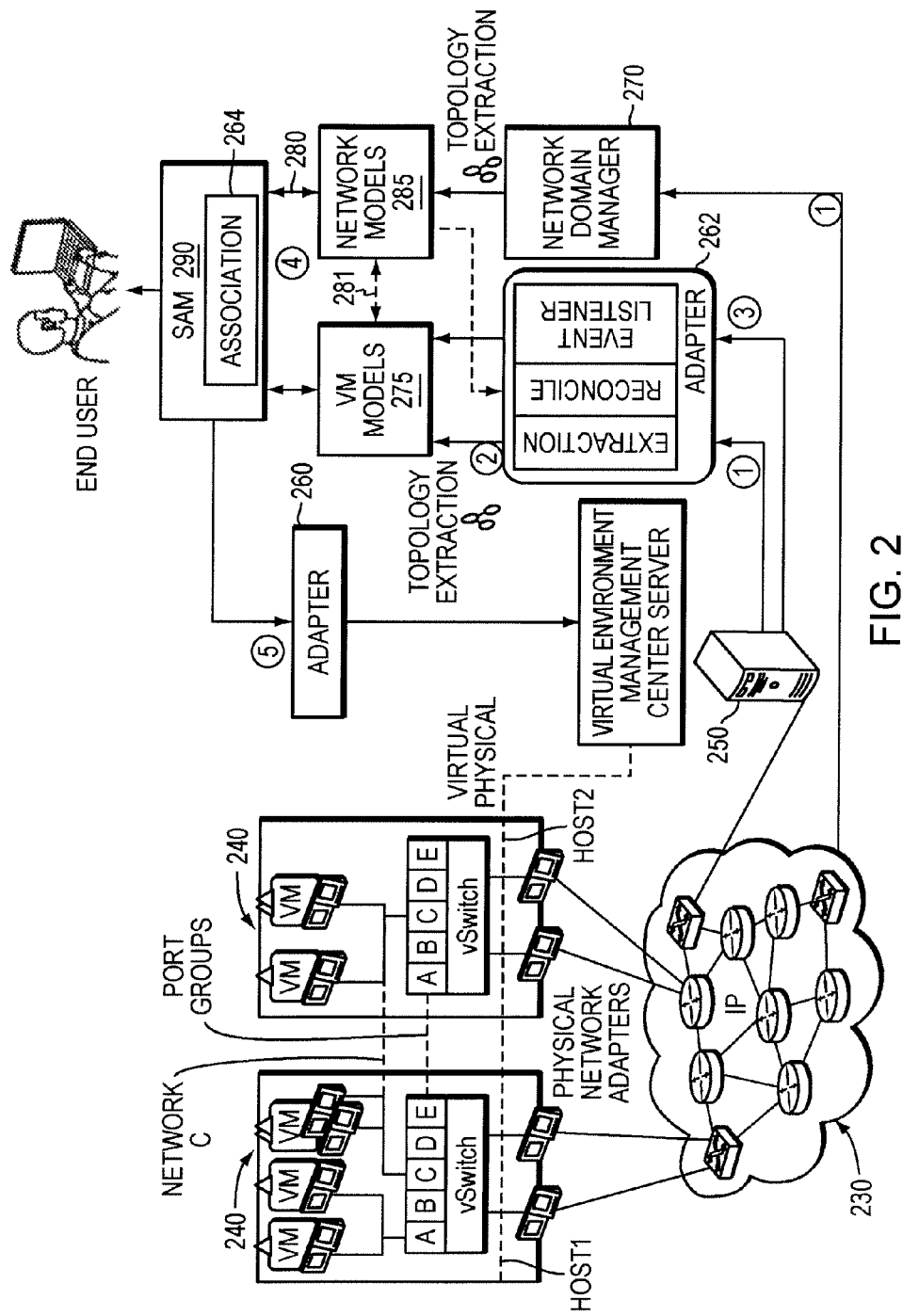
FIG. 2 is a block diagram of a virtual environment illustrating exemplary components of the virtual domain manager and the relationships of the components to applications, infrastructure and tools that may be used in conjunction with the present invention to increase awareness in a virtual environment.

FIG. 2 illustrates an exemplary architecture comprising virtual domain manager adapters 260, 262, 264 of the present invention. An IP infrastructure 230 is coupled to a Virtual Environment Management Center Server (VEMCS) 250. The VEMCS provisions the resources of the infrastructure according to the needs of executing applications and services to provide one or more virtual environments 240 comprising a plurality of virtual machines. The VEMCS includes a database which stores information which maps the virtual machine addresses to physical machine addresses.

A network domain manager 270 includes capability for building an accurate model of the topology of the IP infrastructure 230, wherein the topology is built using structural and causal models. In addition, the network domain manager 270 also monitors for events occurring in the networked environment and uses a causality model to determine authentic problems in the IP network and specifically Root case problems. In a preferred embodiment, the model is generated a product such as the IP Discovery Manager provided by SMARTS, Inc. of White Plains, N.Y. The SMARTS Discovery Manager comprises network topology software that discovers and models dynamically changing infrastructure components, automatically and in real time, including all the physical and logical elements in Layer 2 and Layer 3. One method of constructing a model of an infrastructure is described in patent application Ser. No. 11/726,326, filed May 21, 2007 and entitled "Method and Apparatus for Horizontal and Vertical Modeled Representation and Analysis of Distributed Systems", incorporated herein by reference. The above patent describes a technique of modeling an infrastructure by representing select physical and logical elements as objects and organizing the objects into a plurality of model layers, where each model layer represents at least one function of the distributed network. Behavioral relationships among selected objects in the layers are identified, where the selected objects represent endpoints of the layers, and information is passed between layers at the endpoints. Connectivity between the endpoints is defined using the relationships "LayeredOver" and "Underlying" in the selected objects.

Equivalent tools for generating a network topology model may be substituted herein without affecting the scope of the invention. In addition, although a network topology is shown, it should be understood that topology/causality models may also be provided for storage and application domains.

According to one aspect of the invention, the virtual domain management system comprises an adapter 262 which query the VEMCS to identify virtual entities and their associated information. Virtual management servers may each represent their virtual entities using various syntaxes; it is recognized that the adapter may include parsing and correlation software that is customized to the particular virtual computing environment and is therefore capable of querying the database via VEMCS programming interface for the pertinent information to populate virtualization models 275.

According to one aspect of the invention, it is envisioned that different types of virtualization models (structural and causality) may be provided. The particular types of virtualization models that are provided, as well as their attributes, are a function of the architecture of the virtualized environment that is being modeled. For example, referring now briefly to FIG. 3, a VMware set of virtualization models may include those models that represent entities of the VMWare architecture, and thus include sets for models for a Virtual Center 331 and a Virtual Server 300. A set of Virtual Center models may include models of Compute Resources 338, Data Centers 342, and Resource Pools 346. Each model may include one or more attributes that identify characteristics of the model. For example, a Compute Resource model 338 may include attributes 340 of overallStatus, totalCPU, effectiveCPU, customValue and configStatus.

A set of Virtual Server models 300 may include models of Managed Entities 310, Host Systems 314, Virtual Machines 315, Guest Operating System (OS) 318, Physical Network Interface Card (NIC) 322, Host Virtual Network Interface Card (NIC) 326, Host Virtual Switch 330, and Network 334. Exemplary respective attributes for each model are identified as elements 312, 316, 317, 324, 328, 332 and 336. Although different types of virtualization models will be described it should be understood that the present invention is not limited to the use of any particular type or set of virtualization models, but rather is flexible to support modeling of any type of virtual entity that may be included in any virtual environment.

It should be understood that arriving at the right virtual topology and network topology models is a non-trivial task. When the goal is to provide models that may be correlated across domains, the problem becomes more difficult, as entities in the virtualized environment are sourced by different applications, which may use different syntaxes, naming conventions and modeling structures to describe similar entities. Similarly, an IP infrastructure may be comprised of devices from different manufacturers, each of which provide different port and network identifiers and otherwise represent device information in varying ways. Thus, when constructing a model, it may be that numerous models are generated for the same exact device.

One aspect of the present invention involves reconciling objects in a virtualized topology with objects in physical and application topologies to provide cross domain correlation. Reconciliation of objects may be done in a variety of manners, including by performing exact/approximate attribute-value matching, heuristic matching, semantic string matching and the like.

There are a variety of reconciliation methods known to those in the art, and the present invention is not limited to any particular method of reconciling objects. Reconciliation results in the identification of overlapping objects in the two topologies. The overlapping objects are referred to herein as topology end-points, and information is passed from one topology to another topology through the topology end point.

Referring back to FIG. 2, once each topology model has been reconciled, network topology models are correlated with a virtualized environment topology models by Service Assurance Manager (AM) software 290. The virtual domain manager subscribes to events via the SAM, and the SAM correlates the topology models of the various domains and maintains the causality matrix and code book for use in root cause and impact analysis. As problems are detected, the SAM notifies subscribing services of events to provide increased intelligence to the subscribing services regarding the issues in different domains.

Figure 4A:
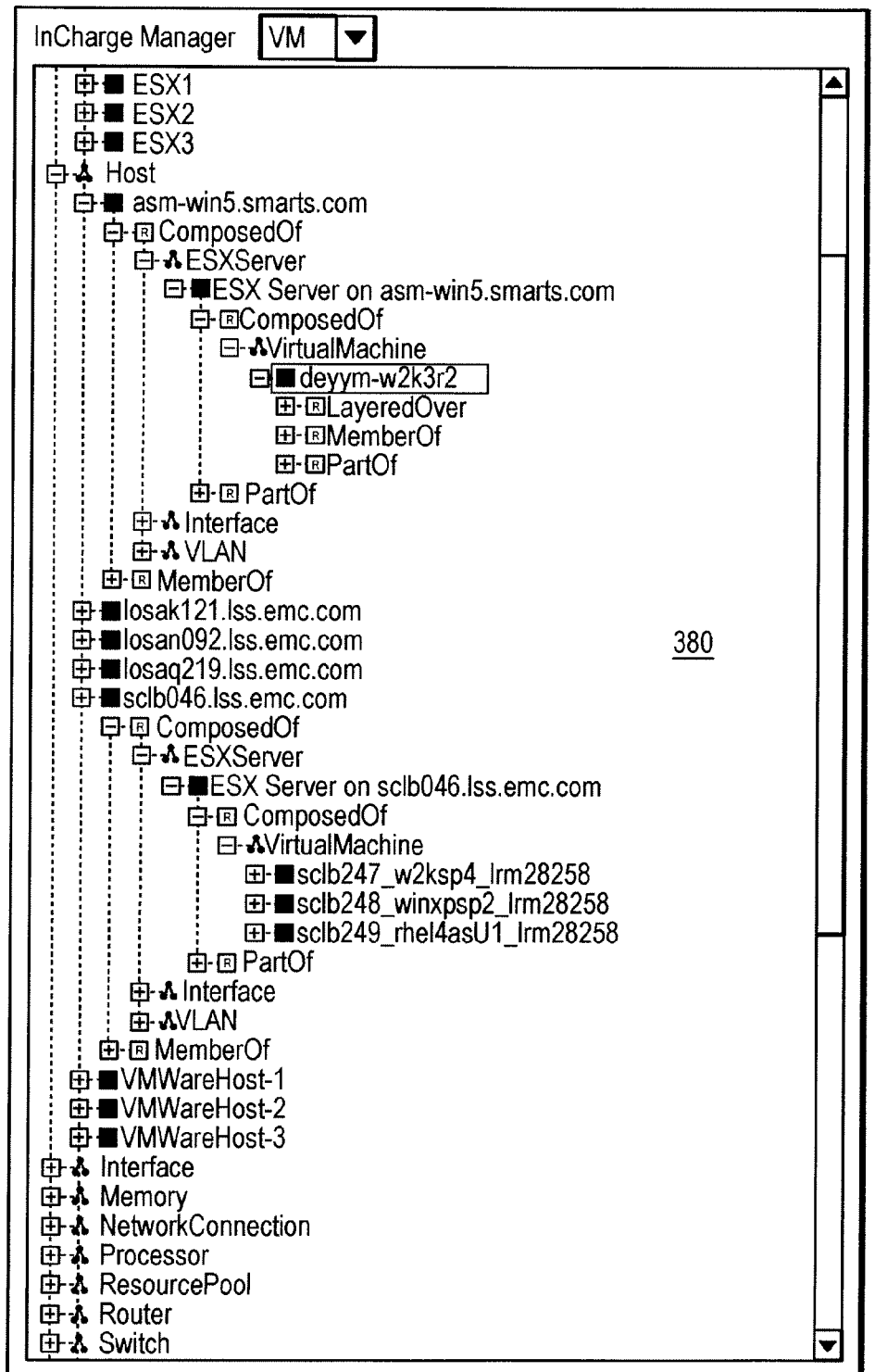
FIG. 4 comprises screen shots that illustrate a virtualized environment discovered topology and a network topology associated with an IT infrastructure.
Figure 4B:
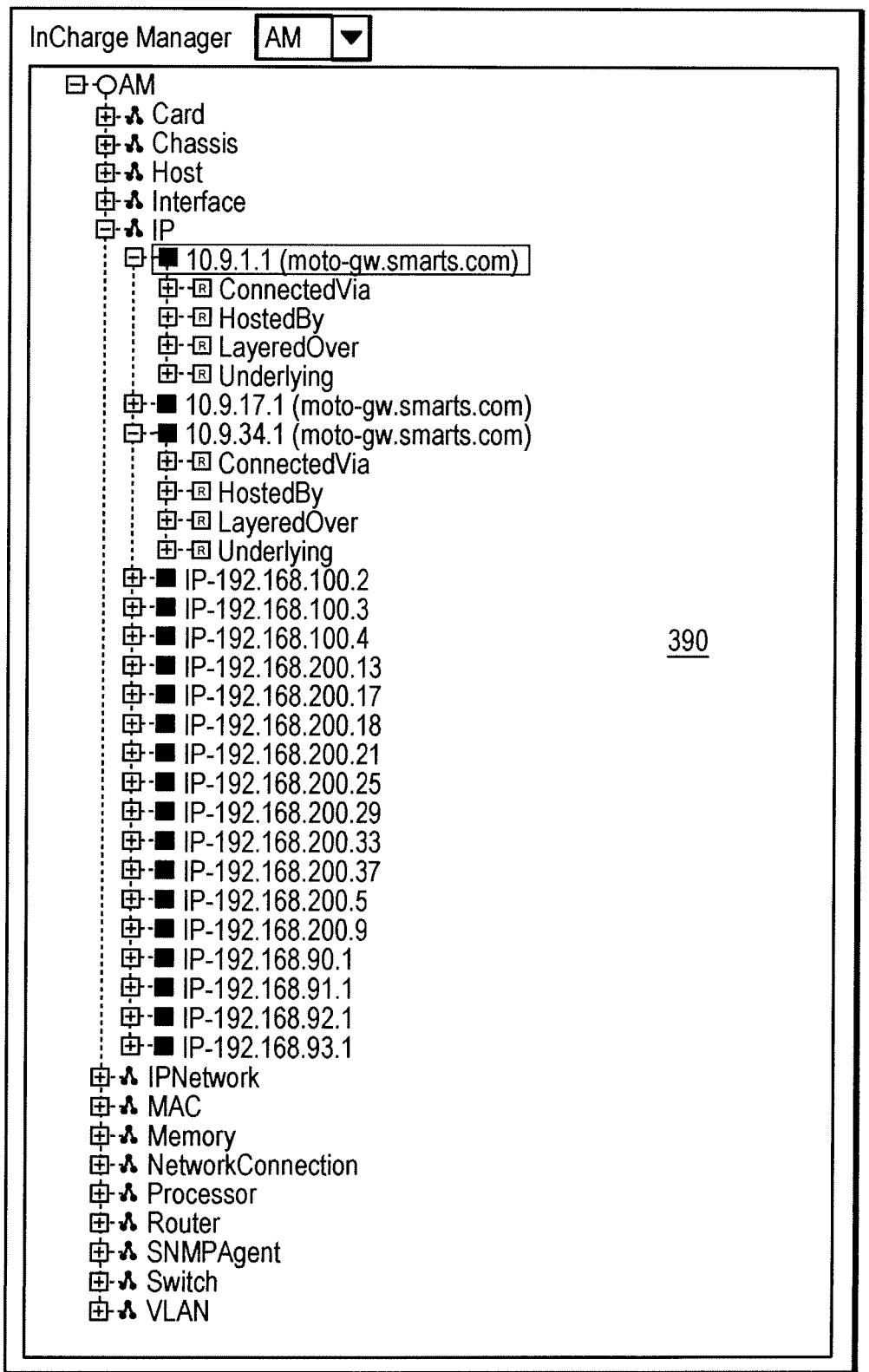

In a preferred embodiment, the Service Assurance Manager software comprises the InCharge SMARTS Service Assurance Manager, from SMARTS of White Plains, N.Y., although similar products that perform equivalent functions may be readily substituted herein without affecting the scope of the invention. FIG. 4 illustrates examples of a virtualized environment topology model 380 and a physical topology model 390 that may be provided to the SAM for correlation.

The SAM performs several intelligent processing functions, 1). including piecing together infrastructure topology of objects and relationships end-to-end across IT domains, 2) integrating infrastructure topology with business topology and its relationships to the infrastructure, 3) creating a top-down view from the business to the infrastructure supporting it 4) correlating data, events, and root cause problems with the topology objects they are associated with 5) creating cause-and-effect relationships between events so analysis from multiple domains can be linked for end-to-end root cause and impact analysis. The SAM thus offers a focal point for integrated monitoring, intelligent analysis, and control of multi-domain, multi-vendor distributed infrastructures supporting mission-critical business. According to one aspect of the invention, it is realized that the SAM may be used in conjunction with a model of a virtual environment to provide the same capabilities to virtual environment management centers.

Information from the SAM is forwarded back to the VECMS via an adapter 260. The adapter 260 may include, for example, physical and application topology as applies to the VEMCS monitored environment, another example might be results of an analysis (RCA/Impact) that is used by the VEMC to take intelligent decisions such as do not plan to provision virtual resources on a host that you can't reach due to network failure.

Thus the virtual domain manager includes a number of adapters which interface between the virtualized environment and its management components and which discover and identify virtual entities and populate virtualization models. As shown in FIG. 2, the adapter also includes event listening functionality, which can be used to detect events in the virtual environment and feed them into the Virtual Domain manger for analysis. The events/analysis results are then propagated to the SAM, which uses the event information in conjunction with event information from the network topology model 285 to perform causality and impact analysis as described below.

Figure 5:
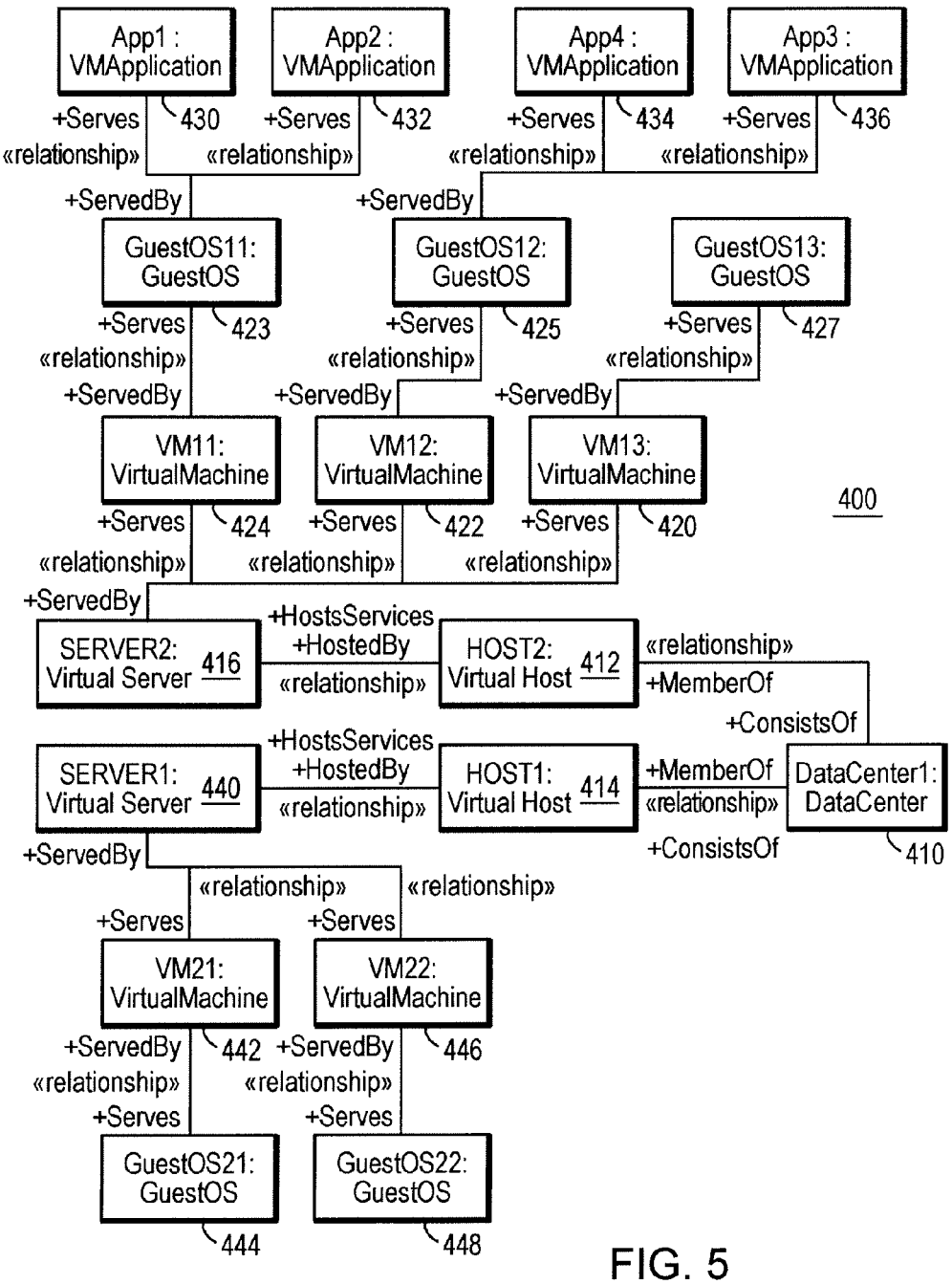
FIG. 5 is a diagram of an exemplary virtualized environment topology constructed using the models of the present invention.

By way of example, FIG. 5 illustrates a topology model 400 of a virtual environment that uses virtualization models of the present invention to represent virtual entities. Relationships between the virtual objects define the virtual topology of the environment. In FIG. 5, the objects are represented as object name: object class. Thus a data center object 410 consists of two virtual hosts; Host1 412 and Host2 414. As mentioned above, for each relationship there is an inverse relationship, so that the relationship between the hosts and the data center can be defined as the hosts are members of the data center, and the data center consists of the hosts.

Each host services a virtual server. Thus Host2 412 provides host services to Server2 416. Similarly, Host1 hosts services for Server1 440. Server1 serves virtual machines VM21 (442) and VM22 (446). In turn, the virtual machines serve respective operating systems 444 and 448.

Operating systems serve applications. Thus application App1 (430) is served by operating system 423, which is further served by virtual machine VM1 (424), which is served by virtual server Server2 (416).

Thus it can be seen that the defined relationships between the virtual objects define a topology of the virtual environment.

Figure 6:
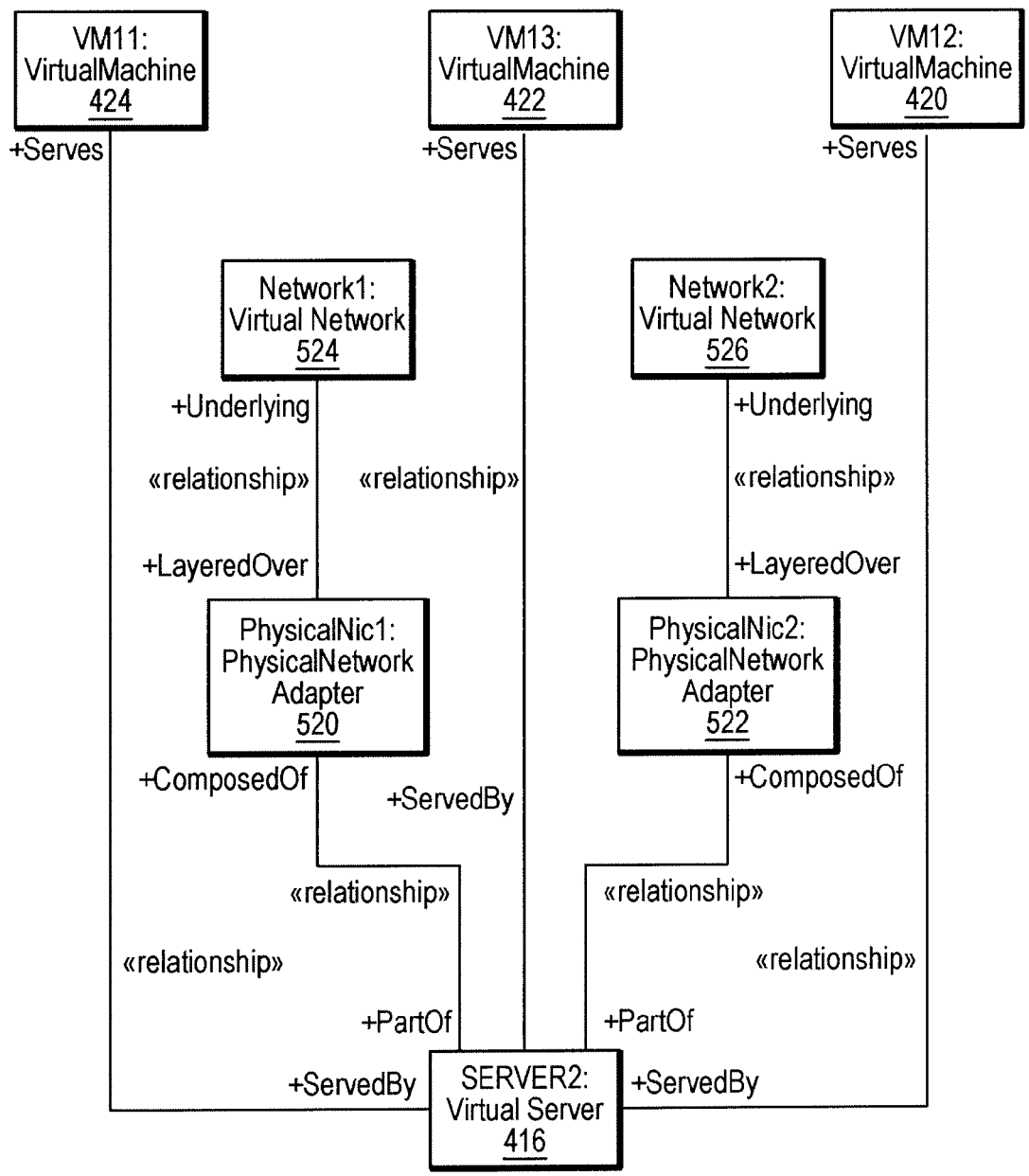
FIG. 6 is a diagram of an exemplary topology model which is relates physical models to the virtualized environment topology model through a server model.

One aspect of the present invention lies in correlating the virtual topology with the physical topology for event propagation. FIG. 6 illustrates the overlap between objects of the virtualized environment topology model and objects of the physical environment topology model. For example, FIG. 6 illustrates the pre-displayed relationship between the virtual server Server2 (416) and virtual machines 420, 422 and 424. However, FIG. 5 also illustrates the relationships that are formed when correlating the physical topology to the virtual topology. The server2 is a topology end-point; i.e., this object overlaps the two topologies. The Server2 (416) is "composed of" physical network adapter PhysicalNIC1 (520), while PhysicalNIC1 is "part of" Server 2. The physical network adapters coupled to virtual networks using layered over and underlying relationships, such as described in application Ser. No. 11/726,326 "Method and Apparatus for Horizontal and Vertical Modeled Representation and Analysis of Distributed Systems" incorporated by reference above.

By identifying overlapping objects (topology end-points) in the different domain topologies, and providing casual model definitions which describe an event propagation behavior through the objects, symptom information may be propagated through domains, allowing for increased accuracy when determining the root cause problem in the overall system as well as the impact of one domain problems on other domains.

Figure 7:
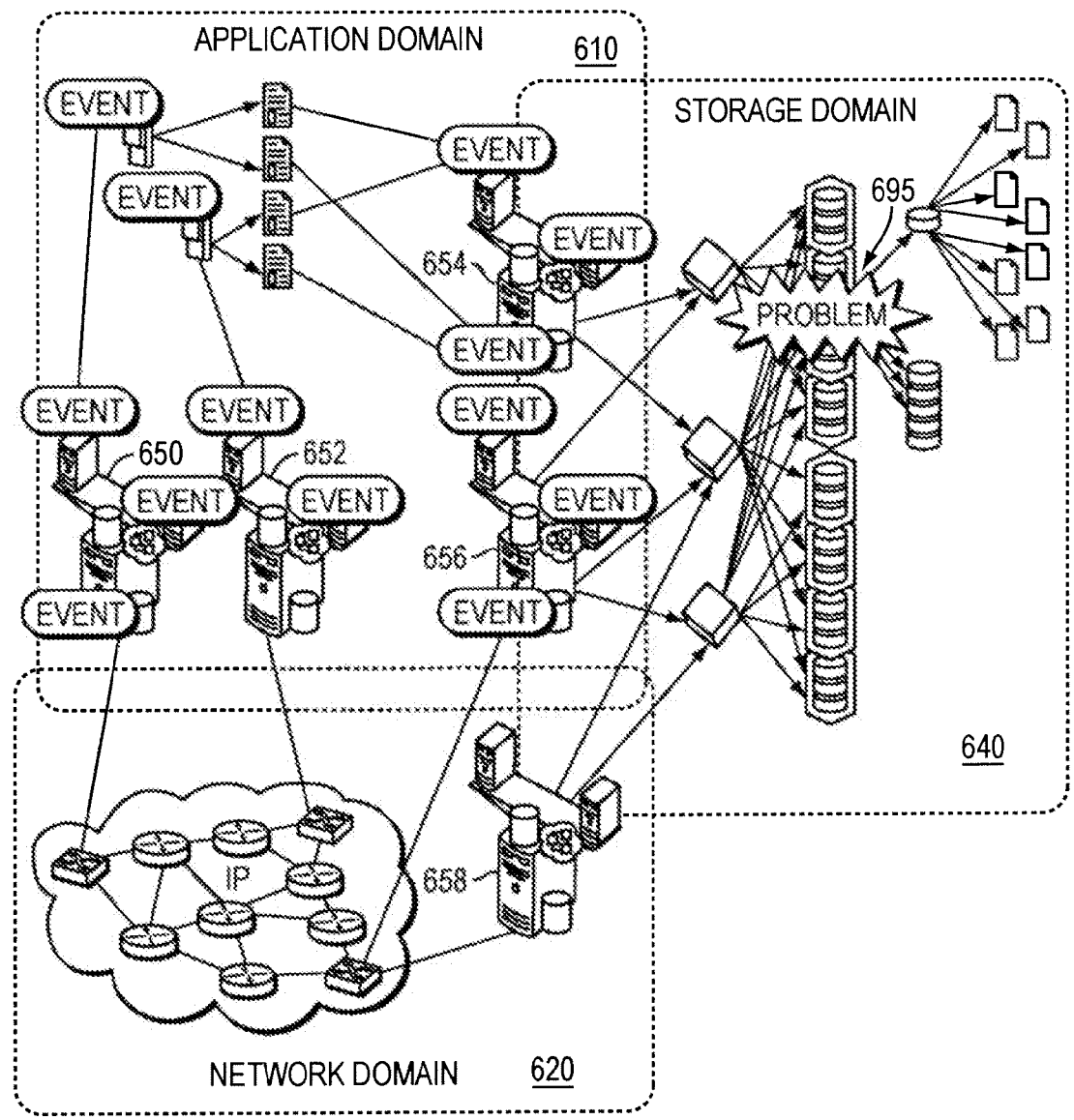
FIG. 7 is a block diagram provided to illustrate the use of the virtual domain manager of the present invention in an infrastructure that comprises an application domain, a network domain and a storage domain.

For example FIG. 7 illustrates an infrastructure that comprises an application domain 610, a storage domain 640 and a network domain 620. Virtual objects 650-658 represent the virtual environment that abstracts the underlying network and storage domains for use by the application domain, and is controlled by a virtual center.

Using the concepts of the present invention, events that are identified in the virtual domain can be interpreted using root cause analysis and codebook technology, to identify an underlying problem 695 in the physical infrastructure. Referring now to FIG. 8, a table of subset of exemplary entries in a causality matrix that may be used to perform impact analysis is shown. The causality matrix provides a mapping between observable events and causing events. As shown in FIG. 8, the causality matrix uses cross-domain information to increase the accuracy of root cause analysis.

The causality matrix relates observable events and symptoms to problems. As events, symptoms and problems are detected, they are analyzed to identify the root cause 750 of the problem, and to identify the impact 730 on the overall infrastructure. Such information may be used to re-provision or otherwise remediate the problem.

Figure 9:
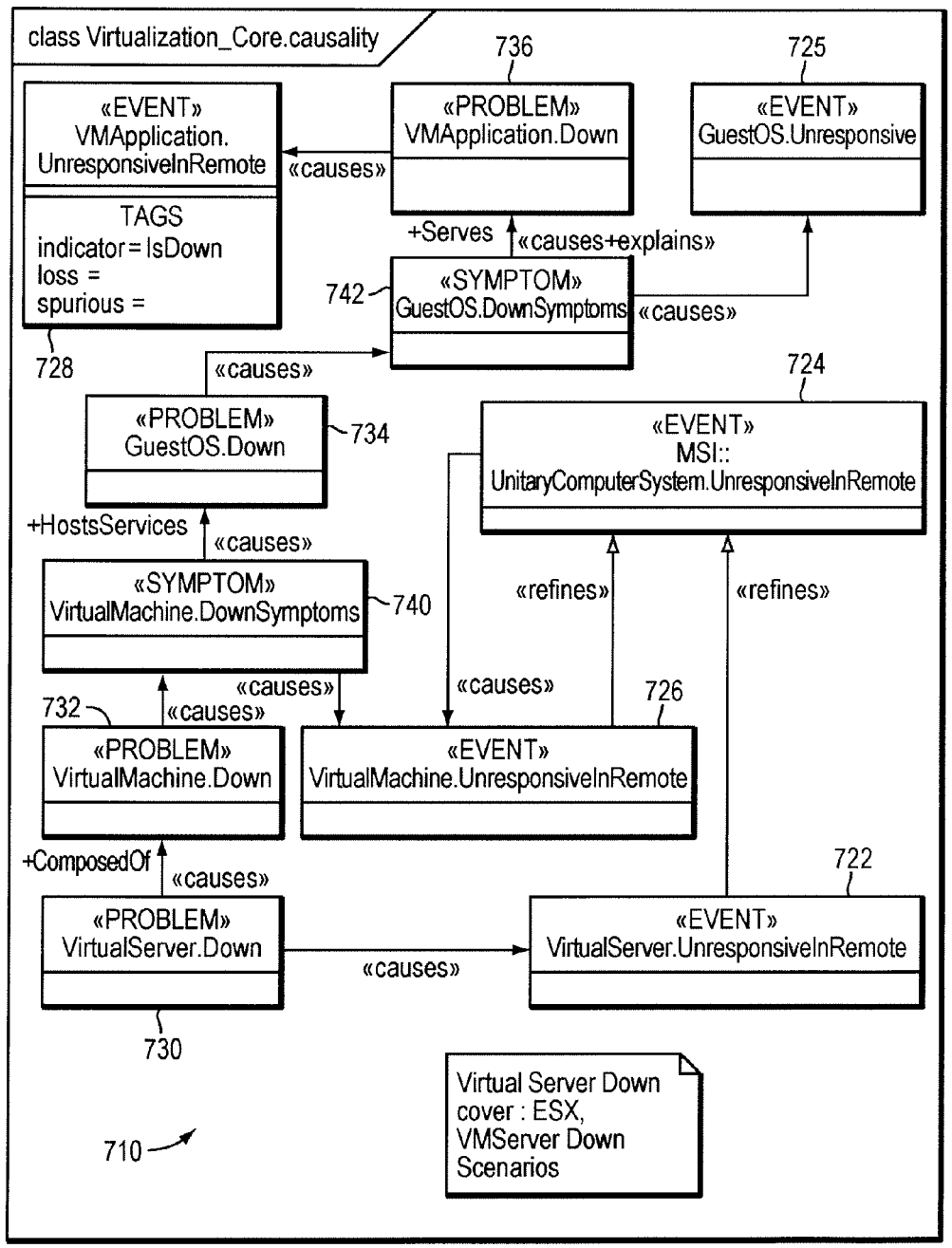
FIG. 9 illustrates an exemplary causality model that may be used to propagate cross domain event, symptom and problem information for root cause analysis.

Referring now to FIG. 9, an example of a causality model 710 is shown to be comprised of a plurality of events 722-728, a plurality of problems 730-736 and symptoms 740 and 742. The relationships between the events, symptoms and problems are denoted by their connecting lines. For example, a symptom 730 of Virtual Server Down causes an event 722 of Virtual Server Unresponsive. It also causes the problem of Virtual Machine down 732, which causes the symptom Virtual Machine Down 740. The symptom Virtual Machine Down triggers the event Virtual Machine Unresponsive 726. Defining the behaviors of the virtual entities using the causality model allows problems and symptoms to trigger events that may be decoded and correlated using the causality matrix.

Figure 10:
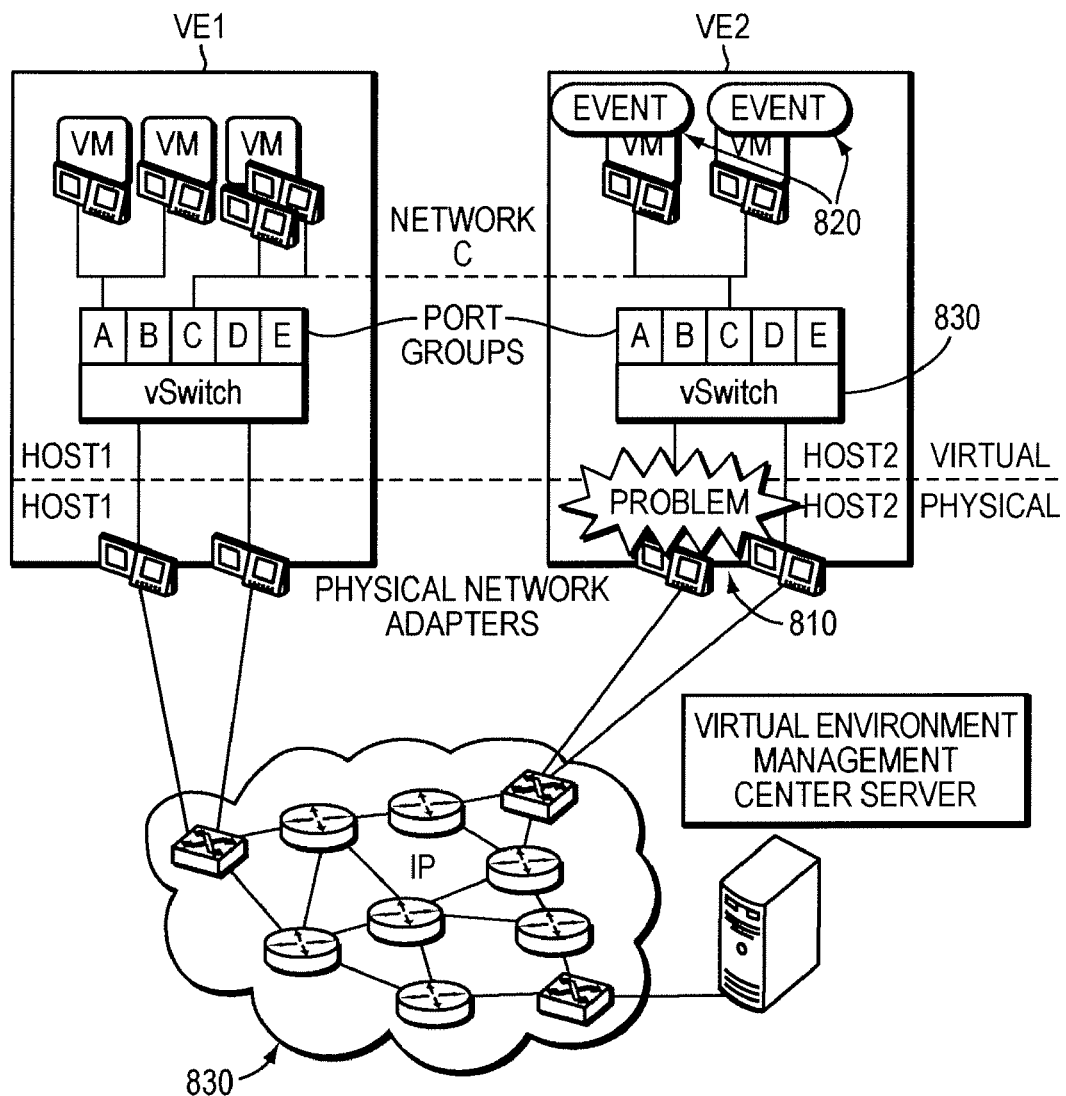
FIGS. 10-12 are block diagrams represent examples of virtual environments layered between an application layer and a physical infrastructure and are used to describe the propagation of event data for use in problem detection.
Figure 11:
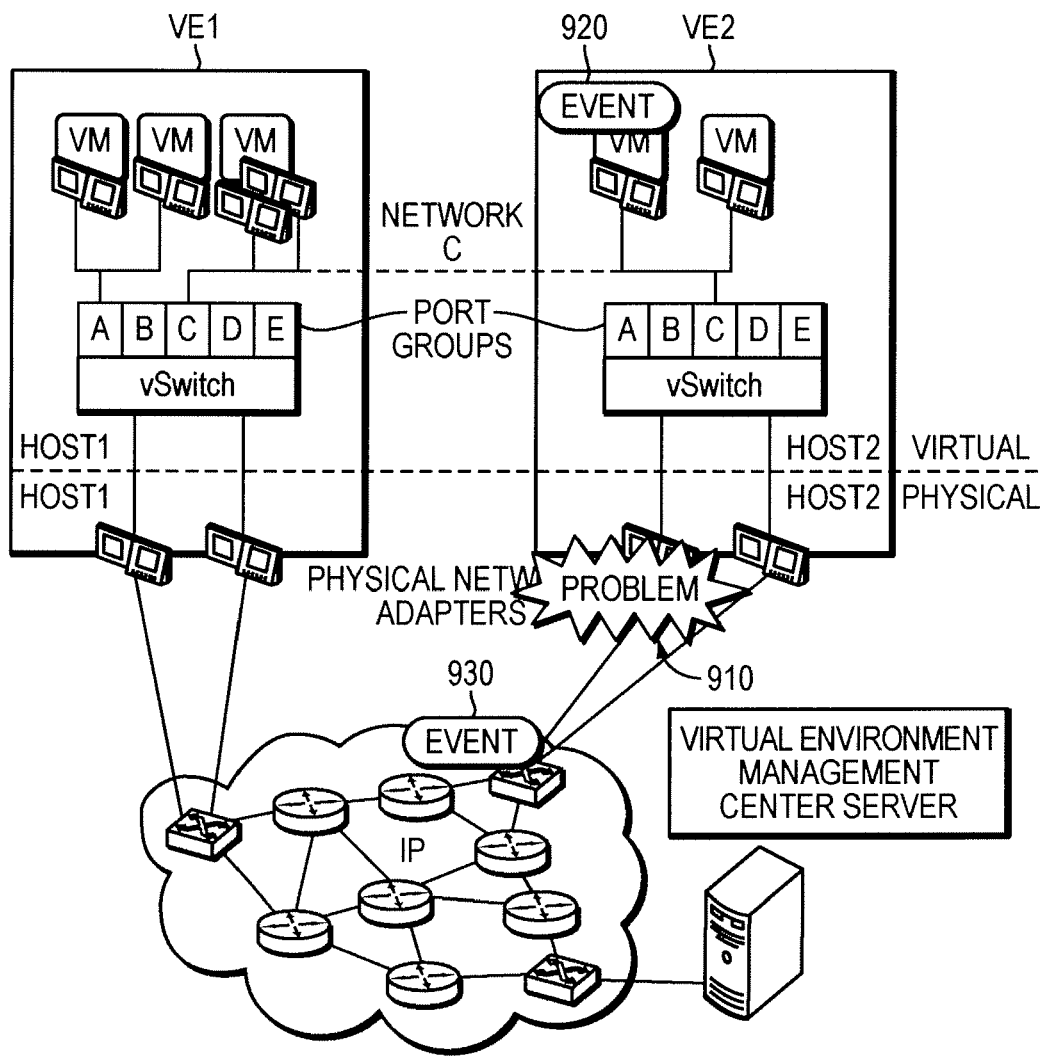
Figure 12:
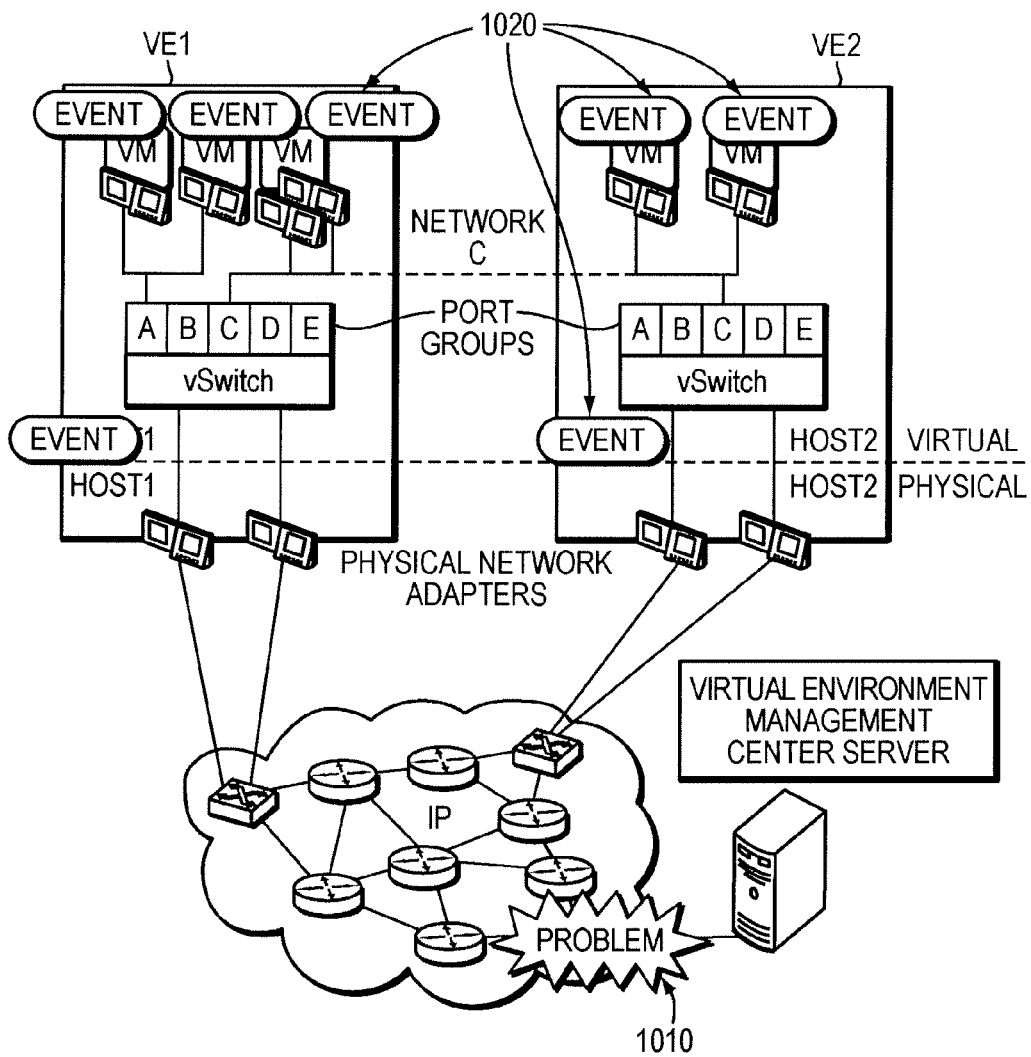

FIGS. 10-12 illustrate diagrams of virtual environments V1, V2 overlaid on a physical infrastructure 830 and will be used to describe how the virtual domain management system of the present invention may be used to correlate the two to enable root cause and impact analysis by the Virtual Environment Management Center (VEMC). In FIG. 10, assume that events 820 are triggered that indicate that Virtual Machines (VMs) of VE2 are unresponsive. An addition symptom may include that the virtual server 830 is not connected to the VMs. Using codebook correlation, it can be determined that the Virtual Host is down is the actual Root Cause and the symptom of Virtual Machine unresponsiveness results from a propagation of that specific problem—such an analysis saves time to resolution as the administrator may direct efforts to first to fixing the problem with the Virtual Host that will potentially solve the unresponsiveness of the virtual Machines as well In FIG. 11, a first symptom 930 is detected, that a peer port of the NIC is down. A second symptom 920 is an unresponsive VM, where the topology indicates that the VM is mapped to the corresponding Physical port that relates to Symptom 930. The code analysis will determine the Root cause of the errors (symptoms observed) is traced to a problem in the NIC card 950.

In FIG. 12, events signaling that the VEMCS is unresponsive, and that connectivity between the Virtual Environment Management Center Server and the VM hosts and their hosted VM's has been lost are collected across the system to determine that a problem may be a network problem identified by a network domain manager where it might be one of the switch being down, a port on the switch being down or a cable being disconnected. The impact of such a problem is identified to be that the VEMCS can't manage the virtual infrastructure until the network connectivity is restored by fixing the problem. As a result, information from the physical domain is used to allow the virtual domain management to act appropriately.

Figure 13:
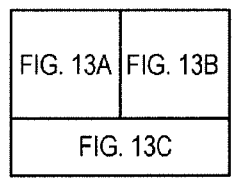
FIGS. 13-16 illustrate exemplary user interface screens that may be used to display the virtual topologies, network topologies and event information and root cause and impact analysis results made available to the operation staff as well as to virtual environment by the present invention.
Figure 13A:
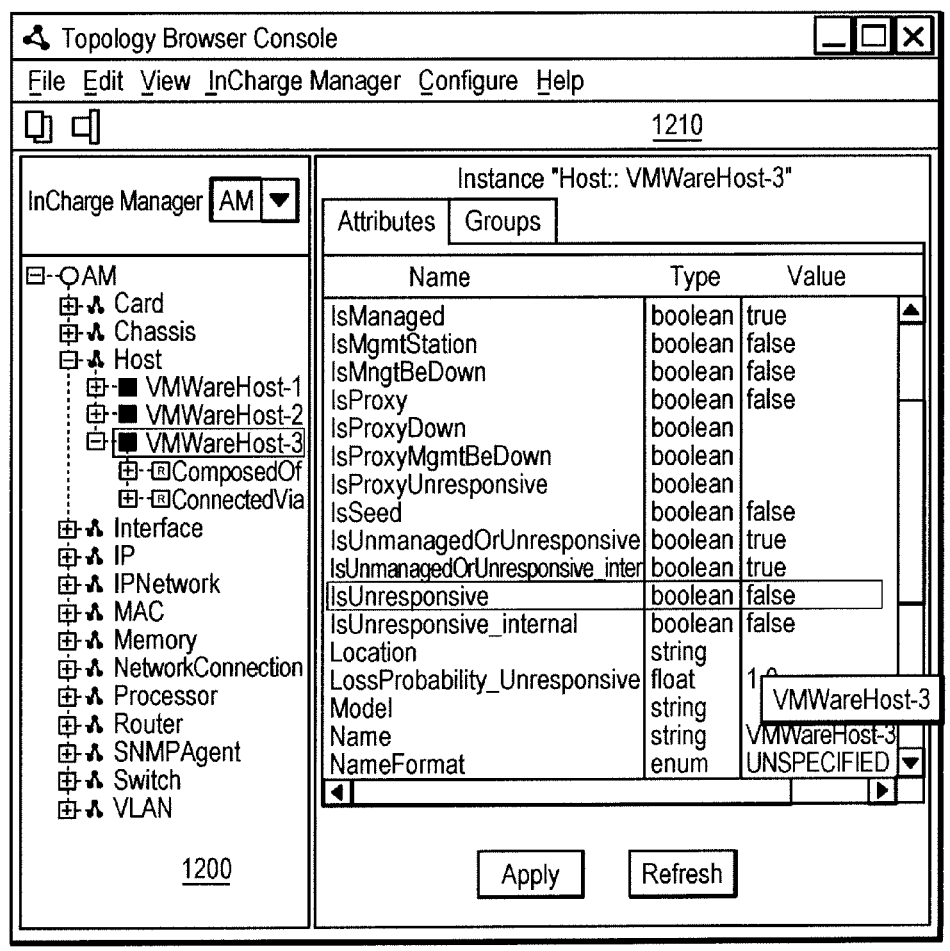
Figure 13B:
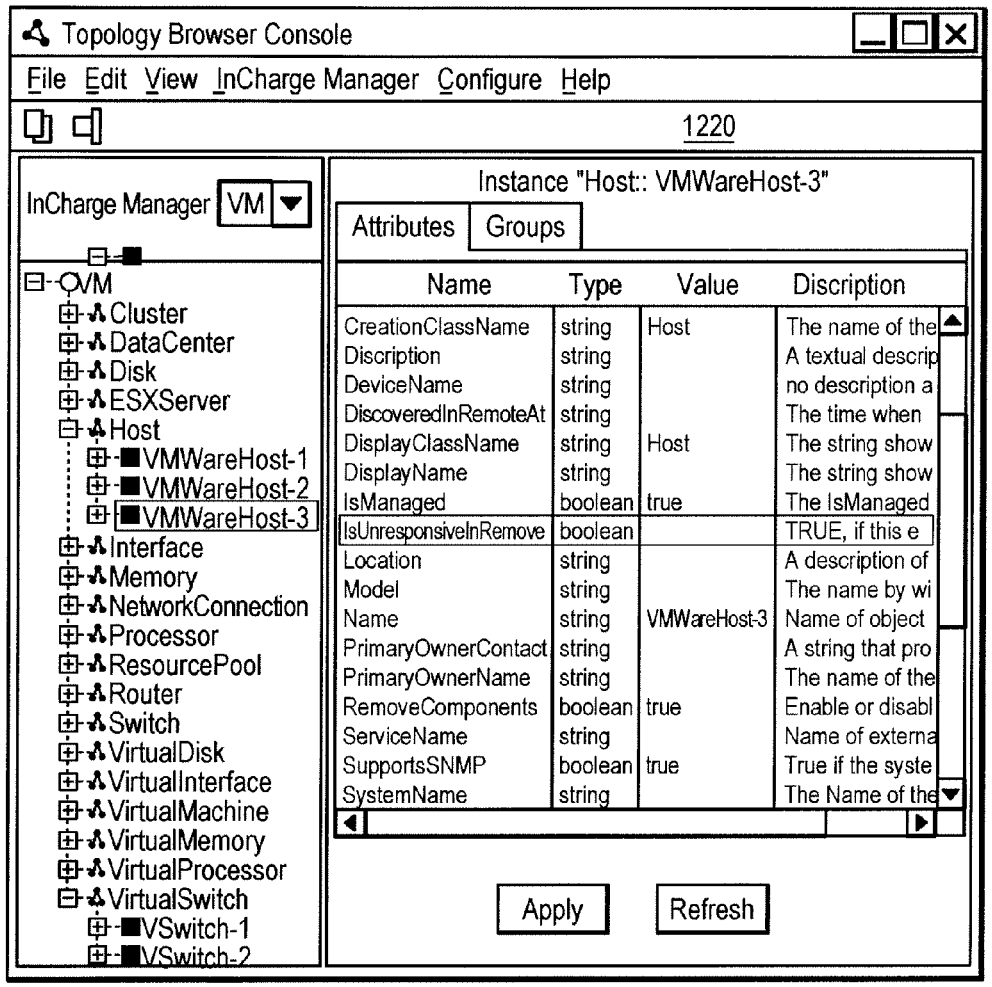
Figure 13C:
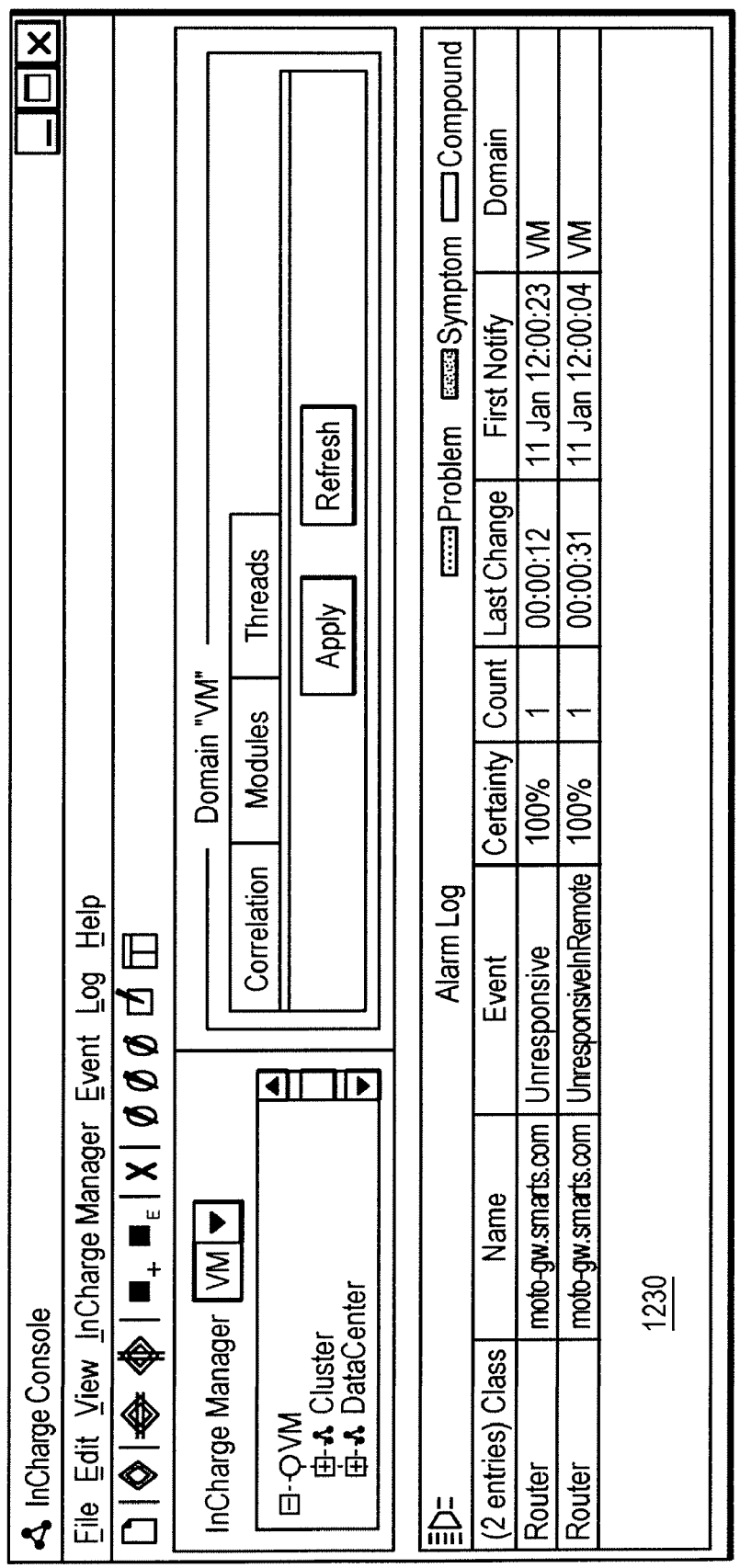
Figure 14:
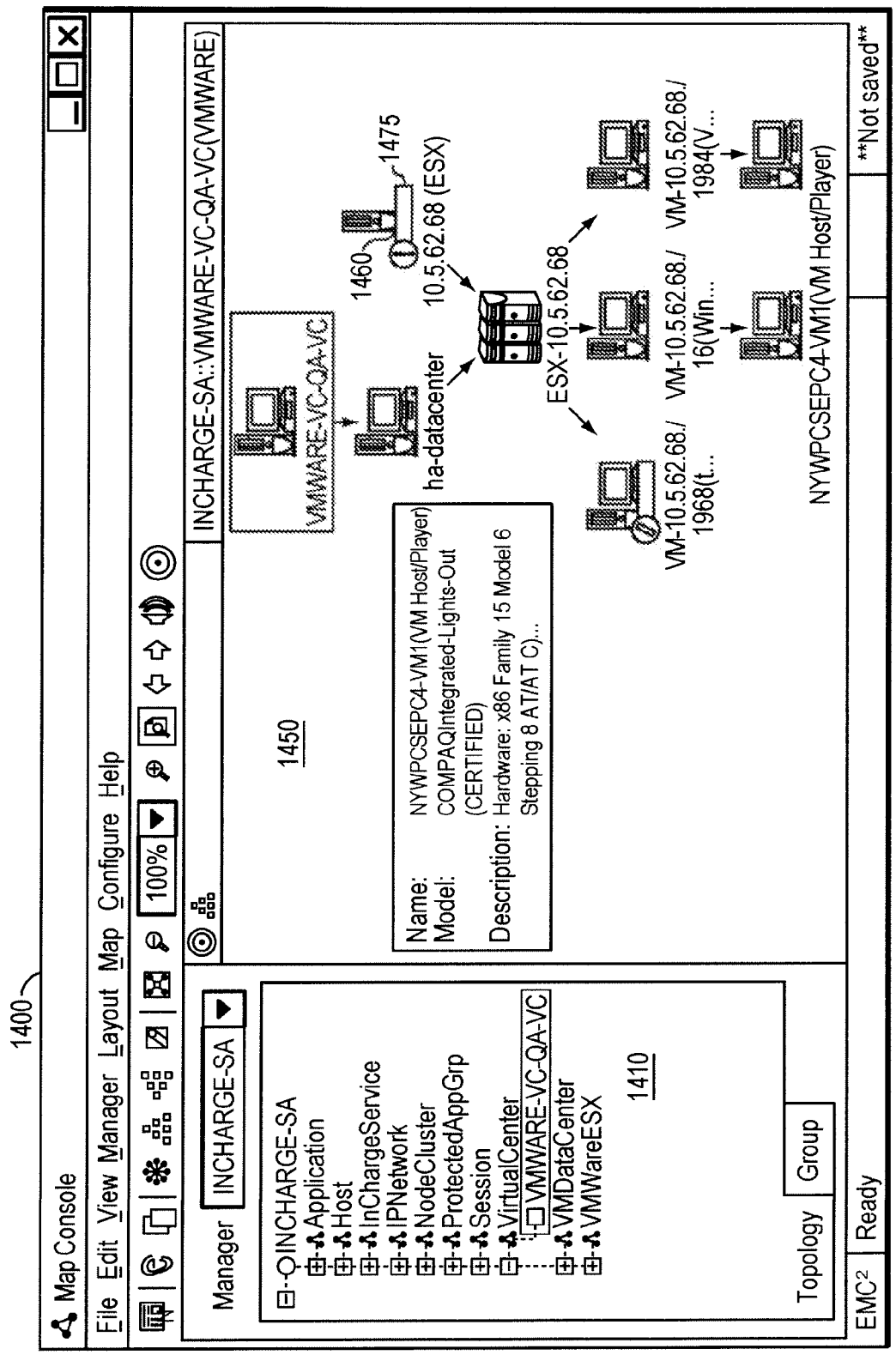
Figure 15:
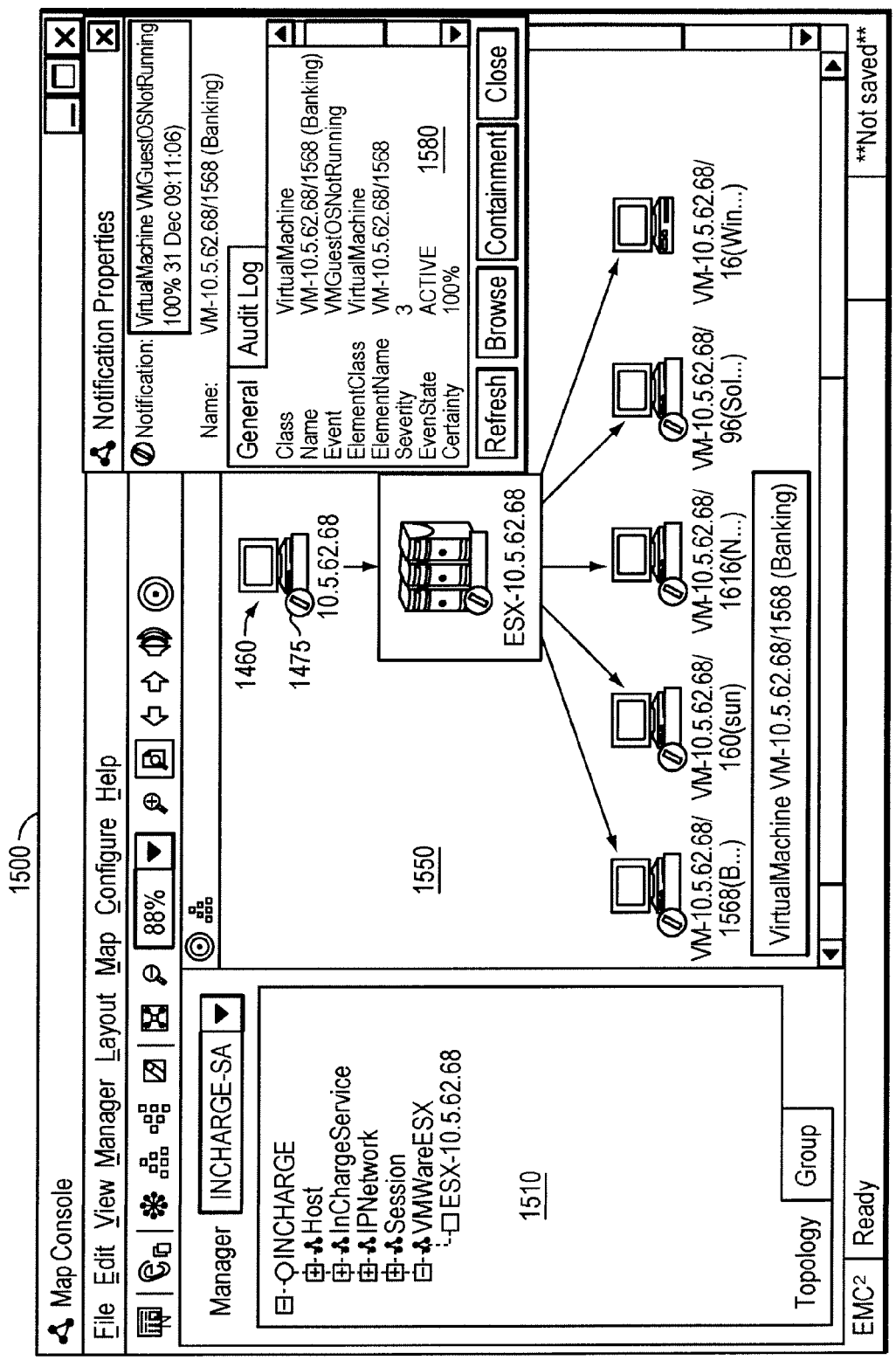

Referring now to FIGS. 13-15, an exemplary screen shots of a user interface that may be used to view virtualized environment topology information, including problem, symptom and impact information are shown.

In FIG. 13, an exemplary screen shot 1200 of a user interface of a virtual domain management system is shown to include a first window portion 1210 for displaying a first topology, a second window portion 1220 for displaying a second topology and a third window portion 1230 for displaying event, root cause analysis and impact analysis information. The information for populating the user interface is provided directly from the models, and provides a fast visual indication to a user regarding the status of the virtual network. Although an exemplary interface is shown, it should be appreciated that the interface may be modified by one of skill in the art to readily provide any information from the topology models to the user.

Referring now to FIGS. 14-15 various different virtual topologies are shown to illustrate the flexibility and robustness of the present invention which can be adapted to support any topology model.

In FIG. 14 an exemplary screen shot 1400 of a virtualized domain management system is shown to include a selection pane 1410 and a display pane 1450. The selection pane 1410 includes a hierarchically ordered menu of entities in the virtual domain, and may be used to allow a user to view the virtual topology from the perspective of the particular selected virtual entity. In the example of FIG. 14, a virtual center is selected in the selection pane 1410, and the virtualized environment topology is represented from the perspective of a Virtual Center in pane 1450. A visual indication 1475 of a problem associated with virtual server 1460 is shown.

Figure 16:
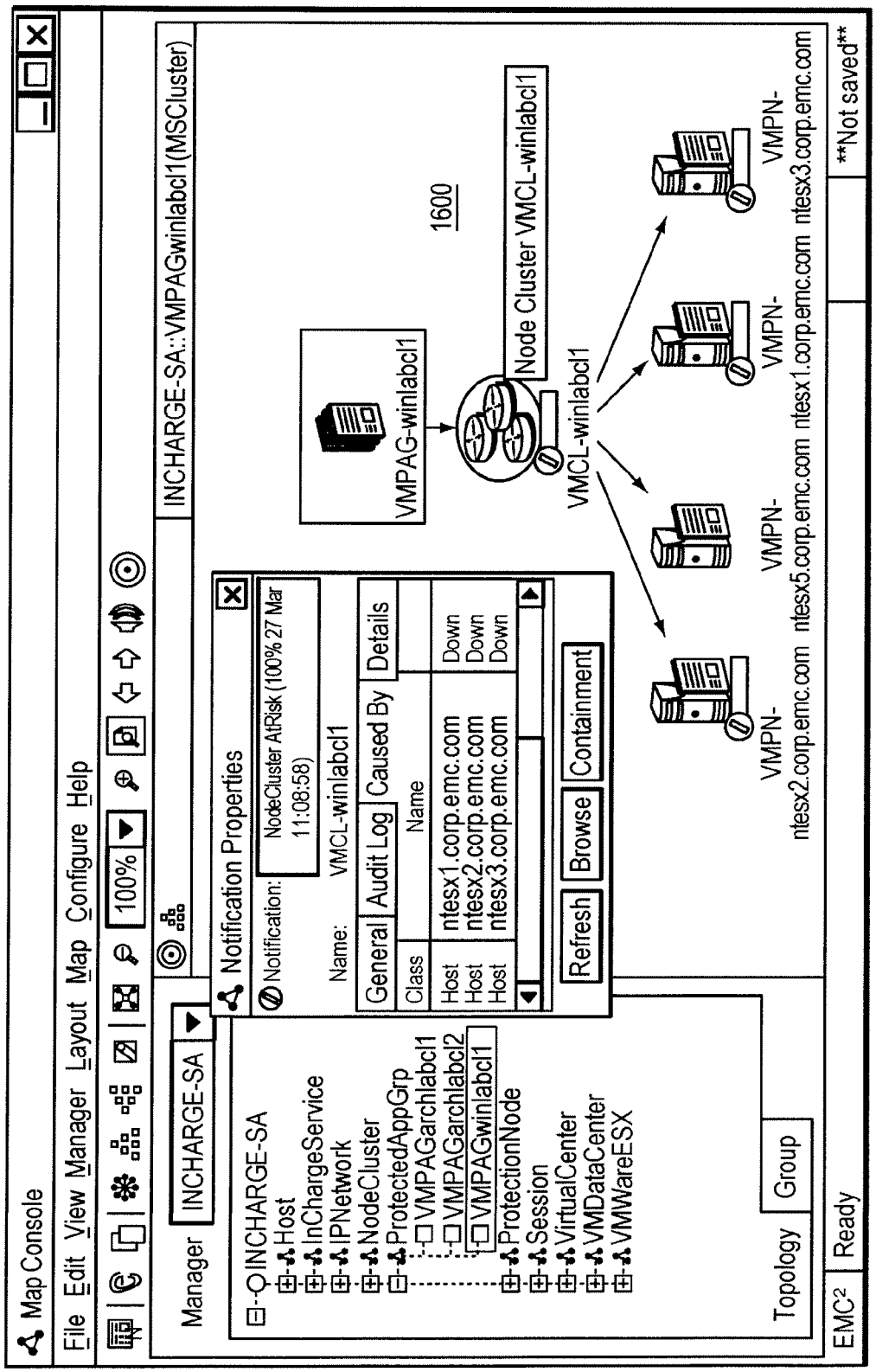

Upon detection of such a problem, a user can navigate the virtualized environment topology by selecting different entities in the selection pane. Thus as shown in FIG. 15 a user may select the virtual server 1460, which was indicated as a problem in FIG. 14. The display pane 1550 displays a virtualized environment topology model rooted at the selected virtualized server 1460. From this perspective, the user can identify events that triggered the event/problem at the server. A pop-up window 1580 that provides additional information regarding any events, symptoms or problems associated with the selected virtual entity may also be displayed. FIG. 16 additionally illustrates a screen shot 1600 of a virtual cluster topology.

Accordingly, a virtual domain management system has been described which provides increased awareness to a virtualized environment through correlation of application, physical and virtual domains and the cross-domain propagation of events, symptoms and other information. Although the disclosure has discussed reconciling a virtualized and physical environment, it should be appreciated that the concepts of the invention may easily be extended to enable cross-domain topology correlation and event propagation for any topologies that are associated with a common infrastructure. For example, concepts of the present invention may be adapted to provide increased awareness for path selection processes disclosed in patent application Ser. No. 11/819,612 entitled "Storage Array Network Path Analysis Server for Enhanced Path Selection in a Host-Based I/O Multi-Path System", commonly owned and incorporated herein by reference. Thus the present invention is not limited strictly to use in the virtual environment, but may add increased awareness of across any two or more domains.

Having described various embodiments of the invention, it will be appreciated that many of the above figures describe methods, apparatus (systems), modules, tools and computer program products. It will be understood that each module, tool or computer program product can be implemented using computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions described.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method for managing a virtual domain includes the steps of:
    maintaining a first topology associated with the virtual domain by representing the virtual domain in at least one computer model, the at least one computer model having one or more computer objects representing the structure and causal behavior of one or more virtual entities of the virtual domain, wherein the virtual domain provides abstraction between a virtual application infrastructure existing in the virtual domain and a physical infrastructure, wherein the virtual application infrastructure is dynamically mapped to resources of the physical infrastructure based on the available resources and application need, and wherein the virtual entities are unaware of the characteristics of the physical infrastructure; wherein at least one of the represented virtual entities is selected from the group consisting of a virtual machine and a virtual server; and
    correlating the first topology to a second topology associated with a second domain by identifying overlapping objects of the first topology and the second topology, the overlapping objects comprising topology end points, wherein information is propagated from the virtual domain to the second domain through the topology end points.

2. The method of claim 1 wherein second topology is associated with at least one of a network infrastructure, a storage infrastructure and an application infrastructure.

3. The method of claim 1 wherein the information includes at least one of event information, symptom information and problem information.

4. The method of claim 3 including the step of:
    providing a mapping between a plurality of observable events and a plurality of causing events across the first and second topologies, and
    determining at least one likely causing event based on one of event, symptom or problem information propagated between the first domain and the second domain.

5. The method of claim 1 wherein the first domain is a virtual domain, and wherein the information is used to improve a quality of provisioning, disaster recovery and high availability decisions in the virtual domain.

6. The method of claim 1, wherein the information is used to improve path selection decisions in the first domain.

7. The method of claim 3 further including the step of displaying the first topology, second topology, at least one of the event, symptom and problem information to a user and results of root-cause and impact analysis, generated using the information, to a user.

8. A domain management system comprising a non-transitory computer readable medium having program code stored thereon, operable when executed to:
    extract structural and behavior model information from entities in a virtual domain for populating and maintain a dynamic representation of a first topology associated with the virtual domain;
    represent the virtual domain in at least one computer model, the at least one computer model having one or more computer objects wherein the one or more computer objects are based on the extracted structural and behavioral model information; wherein the virtual domain provides abstraction between a virtual application infrastructure existing in the virtual domain and a physical infrastructure, wherein the virtual application infrastructure is dynamically mapped to resources of the physical infrastructure based on the available resources and application need, and wherein the virtual entities are unaware of the characteristics of the physical infrastructure; wherein at least one of the represented virtual entities is selected from the group consisting of a virtual machine and a virtual server; and
    correlate the first topology to a second topology by identifying topology end-points, wherein information is propagated between the virtual domain and second domain through the topology end-points.

9. The domain management system of claim 8 wherein the second topology is associated with at least one of a network infrastructure, a storage infrastructure and an application infrastructure.

10. The domain management system of claim 8 wherein the information includes at least one of event information, symptom information and problem information.

11. The domain management system of claim 10, wherein the program code is further operable to:
    provide a mapping between a plurality of observable events and a plurality of causing events across the first and second topologies, and determine at least one likely causing event based on one of event, symptom or problem information propagated between the first domain and the second domain.

12. The domain management system of claim 8 wherein the first domain is a virtual domain, and wherein the information is used to improve a quality of provisioning, disaster recovery and high availability decisions in the virtual domain.

13. The domain management system of claim 8, wherein the information is used to improve path selection decisions in the first domain.

14. The domain management system of claim 8 wherein the program code is further operable to display the first topology, second topology, at least one of the event, symptom and problem information to a user and results of root-cause and impact analysis, generated using the information, to a user.

15. The method of claim 1 wherein the available model representations comprise virtual applications, virtual machines, and virtual servers.

16. The domain management system of claim 10 wherein the available model representations comprise virtual applications, virtual machines, and virtual servers.

\* \* \* \* \*